TRANSISTOR BINARY ADDERS

Filed Dec. 31, 1954

INVENTOR
E. C. THOMPSON

BY R. B. Ardis

ATTORNEY

United States Patent Office 2,908,828

Patented Oct. 13, 1959

2,908,828

TRANSISTOR BINARY ADDERS

Eugene C. Thompson, Livingston, N.J., assignor to Bell Telephone Laboratories, Incorporated, New York, N.Y., a corporation of New York Application December 31, 1954, Serial No. 478,954

6 Claims. (Cl. 307—88.5)

This invention relates generally to circuits for use in pulse-type systems for the transmission of intelligence and more particularly, although in its broader aspects not exclusively, to transistor circuits of the type used in digital computers.

A principal object of the present invention is to simplify the circuitry required for adding a pair of single-digit binary numbers.

Another and more particular object is to reduce the operating power requirements of a simple binary adder, comparator, or disparity recognizer.

Still another object is to provide a simple binary adder which serves also as a pulse amplifying unit and, to a certain degree, as a pulse standardizing unit.

The basic logic functions performed in digital computers and related pulse-type circuits for the transmission of intelligence include those classified as "or," "and," and "inhibit" gating operations. An n-terminal Or gate develops an output whenever any one of its input terminals is energized with the driving state, while an And gate develops an output only if all of its n input terminals are so energized. An inhibit gate connected to the output circuit of either an Or or an And gate prevents any signal from appearing at the inhibit gate output terminal as long as there is a signal at the inhibit terminal of the inhibit gate. More complex digital computer-type circuits for performing the various functions of binary arithmetic (such as, for example, binary adders) can usually be made up of combinations of these basic logic circuits. The logic functions involved may, in general, be defined either with respect to state (1) or with respect to state (0).

A complete circuit for the addition of binary numbers is generally arranged with at least three inputs, corresponding respectively to addend, augend, and carry, and at least two outputs, corresponding respectively to sum and new carry. In many areas of the pulse-communication art, however, the term "binary adder" has a broader significance and encompasses not only the type of circuit described above but also any pulse-type circuit having a pair of input terminals and a single output terminal, which produces one output state whenever the two input states are alike and another output state when they are different. When used as part of a complete adder circuit of the type described above, such a device is sometimes known as a half-adder. In addition, it has occasionally been given such descriptive appellations as comparator and disparity recognizer. It is, however, in this latter sense that the term "binary adder" is used throughout the remainder of the present specification. Thus, in binary language, an "adder" is a device which either produces a (0) whenever the signals at its two input terminals are alike and a (1) whenever they are different or produces a (1) whenever the input signals are alike and a (0) whenever they are different. The first alternative, i.e., an output of (0) for inputs of (0), (0) or (1), (1) and an output of (1) for inputs of (1), (0)

or (0), (1) is usually preferred in the addition of multiple-digit binary numbers but, in its most general form, the adder is simply a device for recognizing whether the input states are alike or different and producing appropriate indication.

In its most general form, the present invention is a binary adder which utilizes the properties of transistors not only to achieve a simpler circuit configuration than is found in the prior art but also to increase the margin against false operation due to $I_{bo}$, to decrease the power drain on the source of driving pulses and to amplify and, in some instances, to standardize the output pulses produced in response to the predetermined combinations of input pulses. In accordance with a principal feature of the present invention, a binary adder is composed of an Or gate having an output terminal and a pair of input terminals, an And gate having an output terminal and the same pair of input terminals as the Or gate, and a first transistor with its collector electrode forming the adder output terminal, one of its remaining electrodes connected to the Or gate output terminal, and the third electrode connected to the And gate output terminal by way of a second transistor. Broadly, the second transistor functions as a switch to apply the output of the And gate to the first transistor in order to block the output of the Or gate under the control of the output of the And gate, thereby permitting the entire circuit combination to operate in its intended manner as a simple binary adder.

In some of its more specific forms, the invention takes the form of a binary adder in which the above-mentioned Or gate includes a pair of semiconductor diodes, each poled in the same direction and connected between the Or gate output terminal and a respective one of the input terminals, and the above-mentioned And gate includes both a pair of semiconductor diodes, each poled oppositely to the Or gate diodes and connected between a common point and a respective one of the input terminals, and a pair of resistors connected in series between the common point and a point of fixed reference potential. The junction between the two resistors forms the And gate output terminal. Sources of direct potential, poled to bias the transistor collector electrodes in the reverse direction, are connected between the respective collector electrodes and the point of reference potential.

A more complete understanding of the invention, in these and other aspects, may be obtained from a study of the following detailed description of the structure and operation of a number of specific embodiments. In the drawings.

Figure 1:
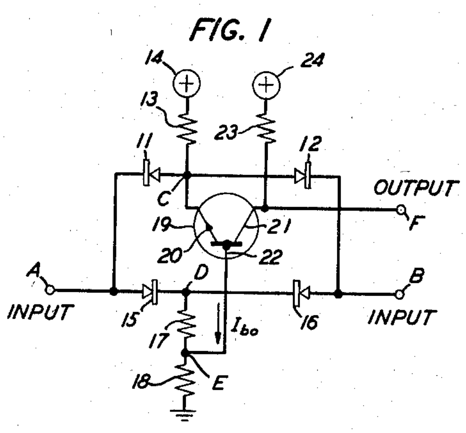
Fig. 1 illustrates an embodiment of the invention in which either (0), (0) or (1), (1) at the input terminals produces state (1) at the output terminal and either (1), (0) or (0), (1) at the input terminals produces state (0) at the output terminal.
Figure 2:
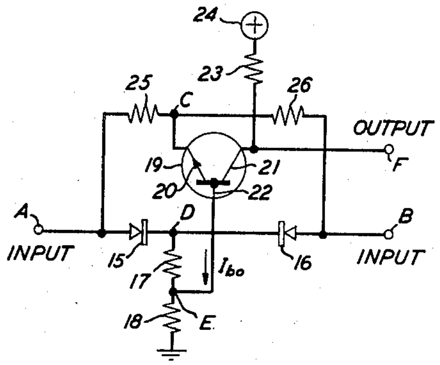
Fig. 2 illustrates a modification of the embodiment of the invention shown in Fig. 1 in which resistors are used instead of the semiconductor diodes in the Or gate.
Figure 3:
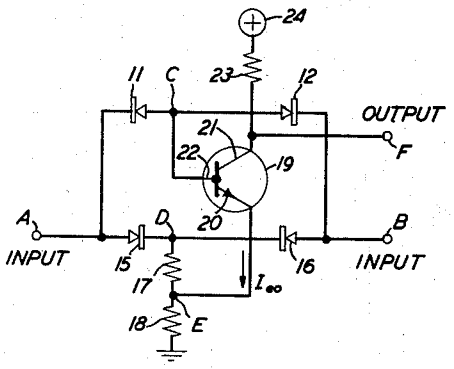
Fig. 3 shows an embodiment of the invention in which either (0), (0) or (1), (1) at the input terminals produces state (0) at the output terminal and either (1), (0) or (0), (1) at the input terminals produces state (1) at the output terminal.
Figure 4:
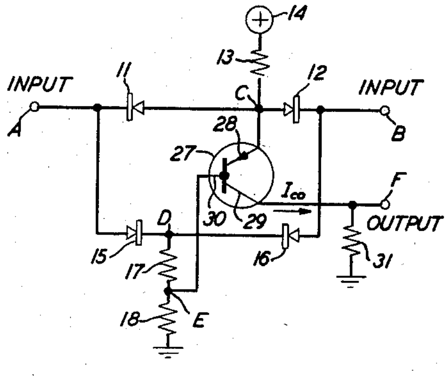
Figure 5:
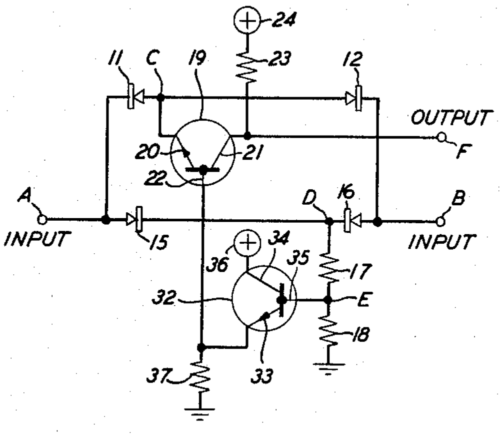

Fig. 4 illustrates an embodiment of the invention using a transistor of opposite conductivity type from the one used in the embodiments shown in Figs. 1, 2, and 3; and Fig. 5 illustrates an embodiment of the invention in which a second transistor is used both to prevent residual base current flowing in the main transistor from causing false operation of the circuit and to avoid a large power drain on the source of input driving pulses.

The embodiment of the invention shown in Fig. 1 is a simple binary adder having an output terminal and a pair of input terminals. A pair of semiconductor diodes 11 and 12 are connected in series between the two input terminals (points A and B) and poled for easy current flow away from their common point (point C) to form an Or gate. Point C is connected through a resistor 13 to a positive direct potential 14 and forms the Or gate output terminal. A second pair of semiconductor diodes 15 and 16 are connected in series between the same two input terminals (points A and B) and poled for easy current flow toward their common point (point D). These diodes cooperate with a resistance divider, made up of a pair of resistors 17 and 18 connected in series between point D and ground, to form an And gate. The common connection point between the two divider resistors (point E) constitutes the And gate output terminal.

The two possible inputs at the input terminals of the binary half adder shown in Fig. 1 are state (0), represented by a potential *e*, and state (1), represented by a potential *e'*. Both potentials are positive with respect to a fixed point of reference potential (e.g., ground), *e'* having the greater amplitude. The logic of the diode gates is defined with respect to state (0), which is the low amplitude signal *e*. Of the following two truth tables, Table 1 describes the performance of the Or gate, while Table 2 describes that of the And gate.

TABLE 1

*Or gate*

| A | B | C |
|---|---|---|
| 1 | 1 | 1 |
| 0 | 0 | 0 |
| 0 | 1 | 0 |
| 1 | 0 | 0 |

TABLE 2

*And gate*

| A | B | E |
|---|---|---|
| 1 | 1 | 1 |
| 0 | 0 | 0 |
| 0 | 1 | 1 |
| 1 | 0 | 1 |

As shown in Table 1, the Or gate delivers an output, state (0), whenever state (0) appears at either one or both of its inputs. As shown in Table 2, the And gate, on the other hand, delivers an output only when state (0) appears at both of its inputs.

In accordance with a principal feature of the present invention, the above-described combination of Or and And gates is made into a binary adder, comparator, or disparity recognizer by the addition of a transistor and several associated circuit elements, the combination having the operating characteristics of an Or gate inhibited by the output of the And gate. In the embodiment of the invention shown in Fig. 1, the active output device is an n-p-n junction transistor 19 having an emitter electrode 20, a collector electrode 21, and a base electrode 22. Emitter electrode 20 is connected to point C, the output terminal of the Or gate, base electrode 22 is connected to point E, the output terminal of the And gate, and collector electrode 21 is connected to the adder output terminal, point F. Collector electrode 21 is also connected through a resistor 23 to a positive D.-C. potential 24. D.-C. potentials 14 and 24 may be, and generally are, supplied from the same source in the illustrated circuit configuration. Potential 14 and the associated resistor 13 may, however, be eliminated without adversely affecting the operation of the circuit in any way.

The following truth table describes the performance of the half adder shown in Fig. 1.

TABLE 3

*Binary adder—Fig. 1*

| A | B | F |
|---|---|---|
| 1 | 1 | 1 |
| 0 | 0 | 1 |
| 0 | 1 | 0 |
| 1 | 0 | 0 |

The adder delivers an output, state (0), only when presented with unlike inputs. A comparison of Tables 1 and 3 shows that the Or gate itself performs in this manner except for the case where both inputs are in state (0). The circuit of Fig. 1 is arranged so that this condition, representing a singular state at the output of the And gate, inhibits the operation of transistor 19.

When both inputs to the binary adder illustrated in Fig. 1 are of the same state, points C and D are equipotential points. Since transistor base electrode 22 is at a lower potential than either of these points, transistor 19 is reverse biased under such conditions and the output voltage is substantially that provided by D.-C. source 24, representing state (1). When the inputs are unlike, point C clamps to the lower potential *e*, while point D clamps to the higher potential *e'*. Proper choice of the base divider ratio $$\frac{R_{18}}{R_{17}+R_{18}}$$

makes point E and the transistor base electrode 22 positive with respect to point C and emitter electrode 20. Under this condition, transistor 19 conducts and clamps to the lower of the two input states. The output voltage is then substantially *e*, representing state (0). If input A is at state (0), diodes 11 and 16 are forward biased and diodes 12 and 15 reverse biased. If input B is at state (0), diodes 12 and 15 are forward biased and diodes 11 and 16 reverse biased.

The embodiment of the invention illustrated in Fig. 1 is, it will be noted, characterized by two definite output states, the high potential one of which may, if desired, be selected so that an output pulse representing state (1) is of a greater magnitude than an input pulse representing state (1). The circuit may thus be arranged to provide amplification and, to a lesser degree, standardization of output pulses. Transistor 19 is either cut off or clamped to the lower signal potential. The output potential at point F in the cut-off condition varies, in general, as a function of $I_{c0}$, the residual collector current for the particular transistor.

Operating margins in the circuit shown in Fig. 1 are controlled primarily by the ratio $$\frac{e'}{e}$$

at points A and B. Potential *e*, representing state (0), should be sufficient to insure a negative emitter base bias large enough to hold the transistor reverse biased even in the presence of maximum residual base current $I_{b0}$ flowing in the external base circuit resistance. The minimum requirement for satisfactory circuit operation is that the reverse bias should be greater than the product of $I_{b0}$ and the external base circuit resistance. In other words, $$e\left(1-\frac{R_{18}}{R_{17}+R_{18}}\right)>I_{b0}\left(\frac{R_{17}R_{18}}{R_{17}+R_{18}}\right)$$

$$e>I_{b0}R_{18}$$

Current into the base electrode of transistor 19 in Fig. 1 should be adequate to sustain both the collector and the external loads. For simplicity, however, it is assumed that the only load is the collector circuit of transistor 19 (i.e., resistor 23 and the source of voltage 24). Under such conditions, the ratio of the forward emitter bias to the net resistance of the base circuit should be equal to or greater than the ratio of collector current to the quantity $$\frac{\alpha}{1-\alpha}$$

where $\alpha$ is the current amplification factor of transistor 19. In other words, $$\frac{e'\left(\frac{R_{18}}{R_{17}+R_{18}}\right)-e}{\frac{R_{17}R_{18}}{R_{17}+R_{18}}} \geq \frac{\frac{E_{24}-e}{R_{23}}}{\frac{\alpha}{1-\alpha}}$$

Thus, as the ratio $$\frac{R_{18}}{R_{17}+R_{18}}$$

is increased above its nominal value, the drive (i.e., the transistor base current provided by the input pulses) increases and the $I_{b0}$ margin decreases. Reduction in $$\frac{R_{18}}{R_{17}+R_{18}}$$

provides greater $I_{b0}$ margin but reduces the driving current.

Fig. 2 shows a modification of the embodiment of the invention illustrated in Fig. 1 in which resistors 25 and 26 are substituted for Or gate diodes 11 and 12. Functionally, the operation of the circuit remains the same. However, since the reverse emitter-base bias is reduced by the voltage drop through resistors 25 and 26, an increase in the ratio of $e'$ to $e$ is required to maintain the same margin of safety against false operation due to $I_{b0}$. Voltage swing at the output is also reduced since, in the circuit arrangement shown in Fig. 2, the transistor clamps with a net resistance remaining in the emitter circuit which limits current flow. The output potential in the (0) state is thus a function of collector current.

An embodiment of the invention in which the And gate operates on the emitter rather than the base of transistor 19 is illustrated in Fig. 3. Transistor base electrode 22 is connected to point C and transistor emitter electrode 20 is connected to point E. Otherwise the circuit is the same as that shown in Fig. 1. The following truth table describes its operation.

TABLE 4

*Binary added—Fig. 3*

| A | B | F |
|---|---|---|
| 1 | 1 | 0 |
| 0 | 0 | 0 |
| 0 | 1 | 1 |
| 1 | 0 | 1 |

Inversion in the sense of the output signal with respect to that of Fig. 1 occurs with this circuit since transistor 19 is forward biased when both inputs represent the same state. In the half-adder shown in Fig. 3, the flow of residual emitter current $I_{e0}$ increases the input driving pulse requirement since it develops a potential in the base divider in opposition to the driving pulse. This potential tends to hold the transistor reverse biased. The circuit of Fig. 3 also differs from that shown in Fig. 1 in that the (0) state output produced when the inputs are at (0), (0) or (1), (1) is not a standard value but rather is dependent on the magnitude of the input states.

Fig. 4 illustrates an embodiment of the invention in which a p-n-p junction transistor is used instead of an n-p-n transistor. The p-n-p transistor 27 has its emitter electrode 28 connected to point C, its collector electrode 29 connected to point F, and its base electrode 30 connected to point E. A resistor 31 is connected between collector electrode 29 and ground, and point C is returned to positive D.-C. potential 14 through resistor 13. Potential 24 and the associated resistor 23 are not used.

The binary adder shown in Fig. 4, like that of Fig. 1, delivers state (1) when both inputs are alike. Transistor 27 is then forward biased and a large current flows through resistor 31 from source 14. When unlike inputs are applied, transistor 27 is reverse biased and its collector electrode 29 is at ground potential. Point F tends to be raised somewhat above ground in this situation by the flow of $I_{c0}$ through resistor 31.

Fig. 5 illustrates an embodiment which is the same as the one shown in Fig. 1 in most major respects. It features, however, an auxiliary n-p-n transistor 32 having an emitter electrode 33, a collector electrode 34, and a base electrode 35. This transistor is connected to increase the margin against false operation due to $I_{b0}$ and, at the same time, decrease the power drain on the source of driving pulses connected to input points A and B. Emitter electrode 33 is connected to base electrode 22 of transistor 19, base electrode 35 is connected to point E between divider resistors 17 and 18, and collector electrode 34 is connected to a positive D.-C. potential 36. A relatively small resistor 37 is connected between emitter electrode 33 and ground.

In the circuit shown in Fig. 5, divider resistors 17 and 18 are both very large, minimizing the power drain on the driving source. Resistor 37, however, which constitutes the external base resistance for transistor 19 is much smaller and prevents $I_{b0}$ from establishing a sufficiently large drop across it for false circuit operation.

All of the binary adder circuits which have been described are particularly useful in lower-power logic circuits. Within operational limits, the output signal of each is in either of two definite states. Several such circuits can be operated in tandem without buffer stages provided a sufficient signal range of power and voltage is available at the input adder to guarantee satisfactory operation of the final adder.

It is to be understood that the above-described arrangements are illustrative of the application of the principles of the invention. Numerous other arrangements may be devised by those skilled in the art without departing from the spirit and scope of the invention.

What is claimed is:

1. A binary adder which comprises an Or gate having a pair of semiconductor diodes, an output terminal, and a pair of input terminals, each of said Or gate diodes being connected between said Or gate output terminal and a respective one of said input terminals and poled in the same direction, an And gate having a pair of semiconductor diodes, an output terminal, the same pair of input terminals as said Or gate, and a pair of resistances, each of said And gate diodes being connected between a common point and a respective one of said input terminals and poled in the same direction, the polarity of said And gate diodes being opposite to that of said Or gate diodes, said resistances being connected in series between said common point and a point of reference potential, and said And gate output terminal being connected to the junction between said resistances, and means to block the output of said Or gate under the control of said And gate including a transistor having an emitter electrode, a collector electrode and a base electrode, a source of direct potential poled to bias said collector electrode in the reverse direction connected between said collector electrode and said point of reference potential, said collector electrode forming the adder output terminal, means connecting one of the remaining said electrodes to said Or gate output terminal, and a transistor switch connected between the other of the remaining said electrodes and said And gate output terminal.

2. A binary adder in accordance with claim 1 in which said emitter electrode is connected to said Or gate output terminal and said base electrode is connected to said And gate output terminal by said transistor switch.

3. A binary adder which comprises an Or gate having a pair of semiconductor diodes, an output terminal, and a pair of input terminals, each of said Or gate diodes being connected between said Or gate output terminal and a respective one of said input terminals and poled in the same direction, an And gate having a pair of semiconductor diodes, an output terminal, the same pair of input terminals as said Or gate, and a pair of resistances, each of said And gate diodes being connected between a common point and a respective one of said input terminals and poled in the same direction, the polarity of said And gate diodes being opposite to that of said Or gate diodes, said resistances being connected in series between said common point and a point of reference potential, and said And gate output terminal being connected to the junction between said resistances, and means to block the output of said Or gate under the control of said And gate including first and second transistors, each having an emitter electrode, a collector electrode, and a base electrode, a source of direct potential poled to bias the collector electrode of said first transistor in the reverse direction connected between said collector electrode and said point of reference potential, a third resistance connected between the base electrode of said first transistor and said point of reference potential, means to bias the collector electrode of said second transistor in the reverse direction, the collector electrode of said first transistor forming the adder output terminal, the emitter electrode of said first transistor being connected to said Or gate output terminal, the emitter electrode of said second transistor being connected to the base electrode of said first transistor, and the base electrode of said second transistor being connected to said And gate output terminal.

4. A binary adder which comprises an Or gate having an output terminal and a pair of input terminals, an And gate having an output terminal and the same pair of input terminals as said Or gate, and means to block the output of said Or gate under the control of said And gate including first and second transistors each having an emitter electrode, a collector electrode and a base electrode, means for reverse biasing said collector electrodes, means connecting one of the remaining electrodes of said first transistor to said Or gate output terminal, voltage divider means coupling the output of said And gate to one of the remaining electrodes of said second transistor, and impedance means for coupling the other of said electrodes of each of said transistors.

5. A binary adder in accordance with claim 4 wherein said voltage divider comprises a pair of relatively large valued resistors and said impedance means comprises a relatively small valued resistor.

6. A binary adder which comprises an Or gate, said Or gate comprising a pair of similarly poled diodes, an output terminal and a pair of input terminals, each of said Or gate diodes being connected between said Or gate output terminal and a respective one of said input terminals, an And gate comprising a pair of similarly poled diodes, an output terminal, the same pair of input terminals as said Or gate and a pair of resistors, each of said And gate diodes being connected between a common point and a respective one of said input terminals, the polarity of said And gate diodes being opposite to that of said Or gate diodes, said resistors being connected in series between said common point and a point of reference potential and said And gate output terminal being connected to the junction between said resistors, and means to block the output of said Or gate under the control of said And gate including first and second transistors each having an emitter electrode, a collector electrode and a base electrode, means for reverse biasing said collector electrodes, means connecting one of the remaining electrodes of said first transistor to said Or gate output terminal, means coupling one of the remaining electrodes of said second transistor to said And gate output terminal, and impedance means for coupling the other of said remaining electrodes of each of said transistors.

References Cited in the file of this patent

UNITED STATES PATENTS 2,670,445 Felker ---------------- Feb. 23, 1954

OTHER REFERENCES

Chaplin: "The Transistor Regenerative Amplifier as a Computer Element," Proc. Inst. of Elec. Eng., vol. 101, part III, No. 73, September 1954, page 305.

Radio Electronics, vol. XXII, No. 9, June 1951, page 39. (Abstract in Division 23.)